UNITED STATES PATENT OFFICE 2,684,968

21-HALO-11β,17α-DIHYDROXY-4-PREGNENE-3,20-DIONES AND THEIR PREPARATION

Clarence G. Bergstrom, Chicago, Ill., assignor to G. D. Searle & Co., Chicago, Ill., a corporation of Illinois No Drawing. Application March 30, 1953, Serial No. 345,681

4 Claims. (Cl. 260—397.45)

The present invention relates to some new halosteroids and, specifically, to 11-oxygenated 21-halo-17-hydroxy-4-pregnene-3,20-diones. More particularly this invention concerns compounds of the general structural formula

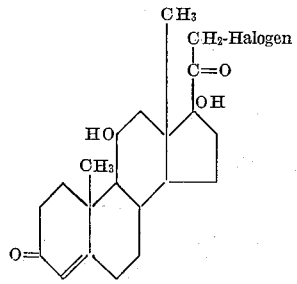

This application is a continuation-in-part of my copending application, Serial Number 275,663, filed March 8, 1952.

The compounds which constitute this invention are prepared most conveniently from the 11-oxygenated 17,21-dihydroxy-4-pregnene-3,20-diones. These compounds are treated with a large excess of a benzenesulfonyl halide, e. g. benzenesulfonyl chloride, preferably 10 to 30 moles, and one mole of pyridine or a lower alkylated pyridine derivative, such as 2,4,6-collidine, to produce the 21-benzenesulfonate. It has been found that practically quantitative yields are obtained in this esterification using benzenesulfonyl chloride at temperatures of about 40° C., while lower temperatures result in much poorer yields. It has further been found that use of toluenesulfonyl chloride and a large excess of the pyridine derivative give unsatisfactory yields.

If the above esterification reaction is permitted to proceed further, especially in the presence of an excess of benzenesulfonyl halide there occurs cleavage of the ester linkage with formation of the 21-halo compound. In this manner the 21-chloro and 21-bromo compounds are conveniently produced. An alternative method, especially suitable for the preparation of the 21-iodo compound, consists in the treatment of the benzenesulfonate with an alkali halide, such as sodium iodide, in an organic solvent, such as a lower alkanone. In the preparation of the 21-iodo compound I prefer to treat an unseparated mixture of the benzenesulfonate and the 21-chloro compound, obtained from the reaction of 11-oxygenated 17,21-dihydroxy-4-pregnene-3,20-dione and benzenesulfonyl chloride as described above, with an alkali iodide in a lower alkanone.

The compounds which constitute this invention are valuable medicinal agents. They are potent reticulo-endothelial stimulants. Further, the claimed compositions are valuable as intermediates in organic synthesis. Thus treatment of the 11β,17α - dihydroxy - 21 - iodo - 4 - pregnene-3,20-dione with mild metallic reducing agents, such as zinc and acid, yields the 11β,17α-dihydroxy-4-pregnene-3,20-dione, a potent antiarthritic agent.

The following experimental part illustrates in detail some of the compounds which constitute this invention and methods for their production. However, this invention is not to be construed as limited thereby in spirit or in scope since it will be apparent to organic chemists that many modifications in materials and methods may be made without departing from the invention. In these examples temperatures are given in degrees centigrade (° C.) and relative amounts of materials in parts by weight. Melting points were determined on a calibrated Fisher-Johns block.

Example 1

A mixture of 100 parts of 11β,17α,21-trihydroxy-4-pregnene-3,20-dione, 32 parts of 2,4,6-collidine and 1380 parts of benzenesulfonyl chloride is stirred with a stream of nitrogen bubbles and maintained at a temperature of 40° C. After 23 hours the reaction mixture is passed through a silica gel column and the benzenesulfonyl chloride is eluted with 80 parts of a 19:1 mixture of benzene and ethyl acetate. Elution of the column with 3:1, 2:1 and 1:1 mixtures of benzene and ethyl acetate yields a mixture of the 21-sulfonate of 11β,17α,21-trihydroxy-4-pregnene-3,20-dione and 21 - chloro - 11β,17α - dihydroxy - 4 - pregnene - 3,20 - dione. Repeated recrystallizations from acetone yield a product melting at about 232–237° C., consisting primarily of

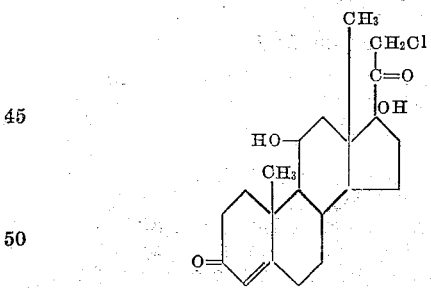

Concentration of the acetone mother liquors yields the 21-benzenesulfonyloxy - 11β,7α - dihydroxy-4-pregnene-3,20-dione.

Example 2

A solution of a mixture of the 21-chloro and 21-benzenesulfonyloxy derivatives, obtained by concentration of the eluates in the preceding example, in 5000 parts of acetone is treated with a solution of 220 parts of sodium iodide in 5000 parts of acetone. The reaction mixture is kept at room temperature for 2 hours and then heated at 52° C. to evaporate the acetone, the iodide remaining as a thick sludge. The 21-iodo-11β,17α-dihydroxy-4-pregnene-3,20-dione is crystallized from acetone in the form of shining prisms, melting at about 148–150° C. The ultraviolet absorption spectrum shows a maximum at about 234 millimicrons with a molecular extinction coefficient of about 19,400. The same product is obtained by the identical treatment of 21-benzenesulfonyloxy - 11β,17α - dihydroxy - 4 - pregnene-3,20-dione. The product has the structural formula

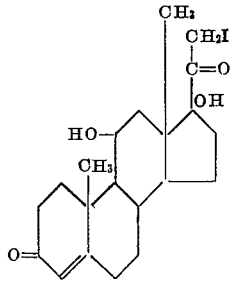

Example 3

The crude sludge of the 21-iodo-11β,17α-dihydroxy-4-pregnene-3,20-dione, produced as in Example 2, is dissolved in 2000 parts of glacial acetic acid and maintained at room temperature for 45 minutes. The liberated iodide is reduced with 100 parts of zinc dust and the mixture is poured into water. The resulting aqueous suspension is extracted with methylene chloride and this extract is washed with 10% sodium bicarbonate solution and with saturated sodium chloride solution. It is then filtered through anhydrous sodium sulfate and evaporated to dryness in vacuo. Recrystallized from acetone, the crude 11β,17α-dihydroxy-4-pregnene-3,20-dione melts at about 195–199.5° C. It has the structural formula.

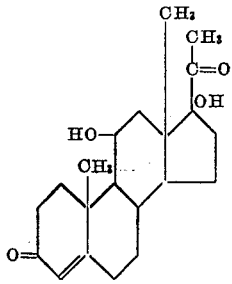

Example 4

A mixture of 50 parts of 11,17,21-trihydroxy-4-pregnene-3,20-dione, 16 parts of 2,4,6-collidine and 800 parts of benzenesulfonyl bromide is stirred under nitrogen and maintained at a temperature of 38° C. After 24 hours the reaction mixture is passed through a chromatography column packed with silica gel and the column is eluted with a 5% solution of ethyl acetate in benzene. Elution with a mixture of equal parts of benzene and ethyl acetate yields a mixture of 21 - benzenesulfonyloxy - 11,17 - dihydroxy - 4-pregnene-3,20-dione and 21-bromo-11,17-dihydroxy-4-pregnene-3,20-dione. Repeated recrystallizations from acetone yield the pure 21-bromo compound. An additional yield can be obtained by treatment of the mother liquor with sodium bromide in acetone at room temperature for 3 hours and removal of the solvent in vacuo. The ultraviolet absorption spectrum of an etheric solution shows a clearly defined maximum at about 235 millimicrons with a molecular absorption maximum of about 17,300. The compound has the structural formula

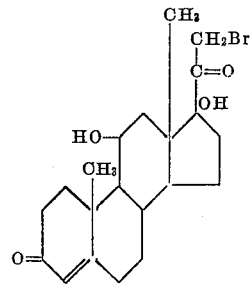

Example 5

A mixture of 204 parts of 17α,21-dihydroxy-4-pregnene-3,11,20-trione, 68 parts of 2,3,6-collidine and 1380 parts of benzenesulfonyl chloride is stirred at 0° C. for 24 hours. The reaction mixture is then applied to a chromatography column containing 17,000 parts of silica. The excess benzenesulfonyl chloride is eluted with a 5% solution of ethyl acetate in benzene. Elution with a 33% solution of ethyl acetate in benzene and evaporation of the solvents from the eluate yields crude 21-benzenesulfonyloxy-17α-hydroxy-4-pregnene-3,11,20-trione.

1648 parts of the crude benzenesulfonate are dissolved in 40,000 parts of acetone containing 1800 parts of sodium iodide. The acetone solution is concentrated and the residue is extracted with ethyl acetate and this extract is evaporated. The resulting residue is twice recrystallized from acetone. The 21-iodo-17α-hydroxy-4-pregnene-3,11,20-trione thus obtained melts at about 160–180° C. with decomposition. It has the structural formula

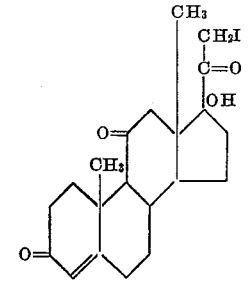

I claim:
1. A 21 - halo - 11β,17α - dihydroxy - 4 - pregnene-3,20-dione.
2. A 21 - chloro - 11β,17α - dihydroxy - 4 - pregnene-3,20-dione.
3. A 21 - iodo - 11β,17α - dihydroxy - 4 - pregnene-3,20-dione.
4. A 21 - bromo - 11β,17α-dihydroxy - 4 - pregnene-3,20-dione.

No references cited.